United States Patent [19]
White, Jr.

[11] 3,982,679
[45] Sept. 28, 1976

[54] MACHINE FOR DRIVING SPRING PINS

[76] Inventor: William P. White, Jr., c/o Mechanical Application, Inc., Airport Road, Wiscasset, Maine 04578

[22] Filed: Aug. 11, 1975

[21] Appl. No.: 603,667

[52] U.S. Cl. ................................................ 227/116
[51] Int. Cl.² .............................................. B27F 7/02
[58] Field of Search .................. 227/26, 93, 97, 98, 227/114, 115, 116, 135, 138

[56] References Cited
UNITED STATES PATENTS

| | | | |
|---|---|---|---|
| 36,191 | 8/1862 | Critchett | 227/116 |
| 326,780 | 9/1885 | Raymond | 227/135 |
| 2,947,990 | 8/1960 | O'Kelley | 227/116 |
| 2,979,721 | 8/1961 | Helda | 227/97 |
| 3,788,537 | 1/1974 | Fox | 227/142 |

Primary Examiner—Granville Y. Custer, Jr.
Attorney, Agent, or Firm—C. Yardley Chittick

[57] ABSTRACT

A machine for driving a spring pin into a work piece. The pins are automatically fed from a supply to the pin driving means. Pins of varying lengths and diameters can be accommodated by changing a few parts. The work piece to receive the pin is placed at a correct location below the driving means. The machine, when actuated, goes through one complete cycle of driving a pin into the work piece and reloading itself for the next cycle.

9 Claims, 5 Drawing Figures

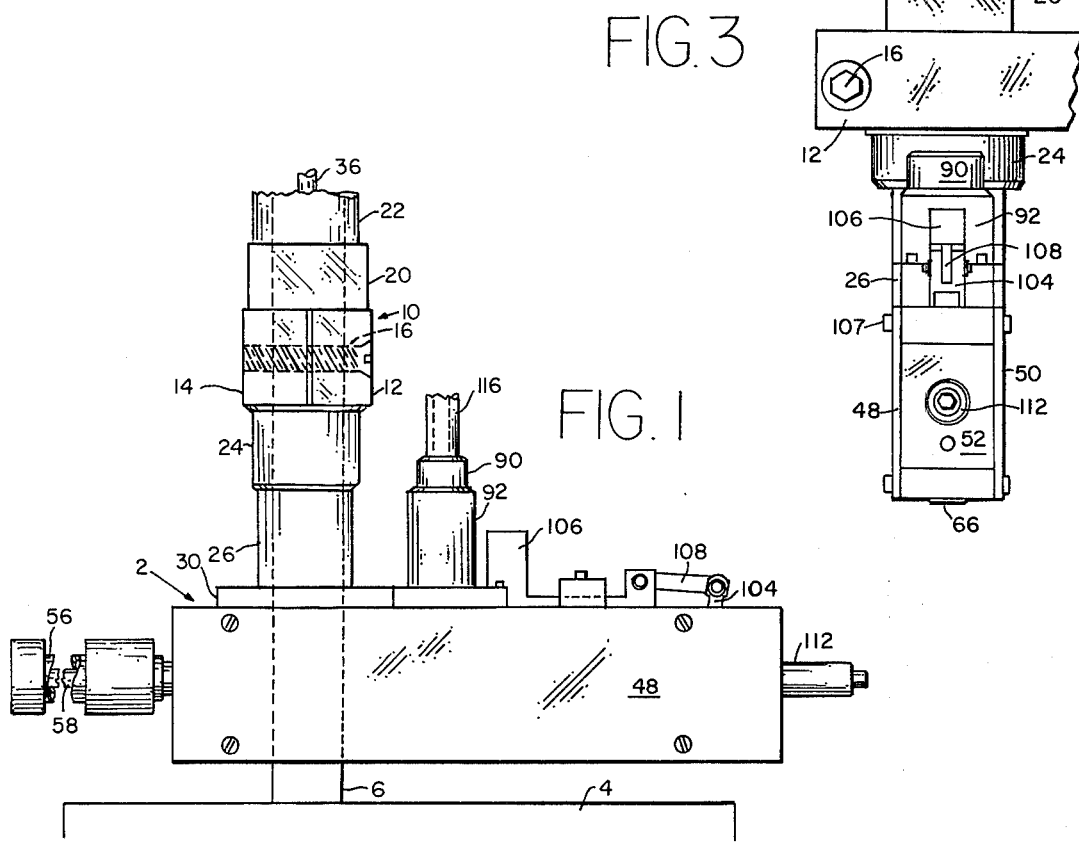
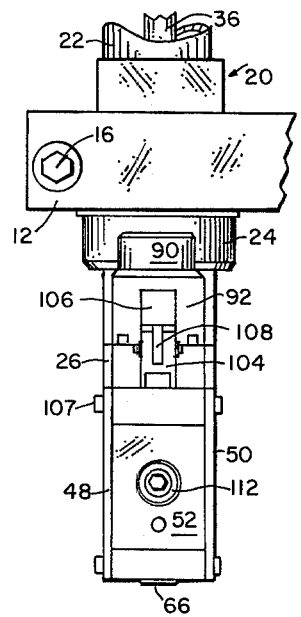
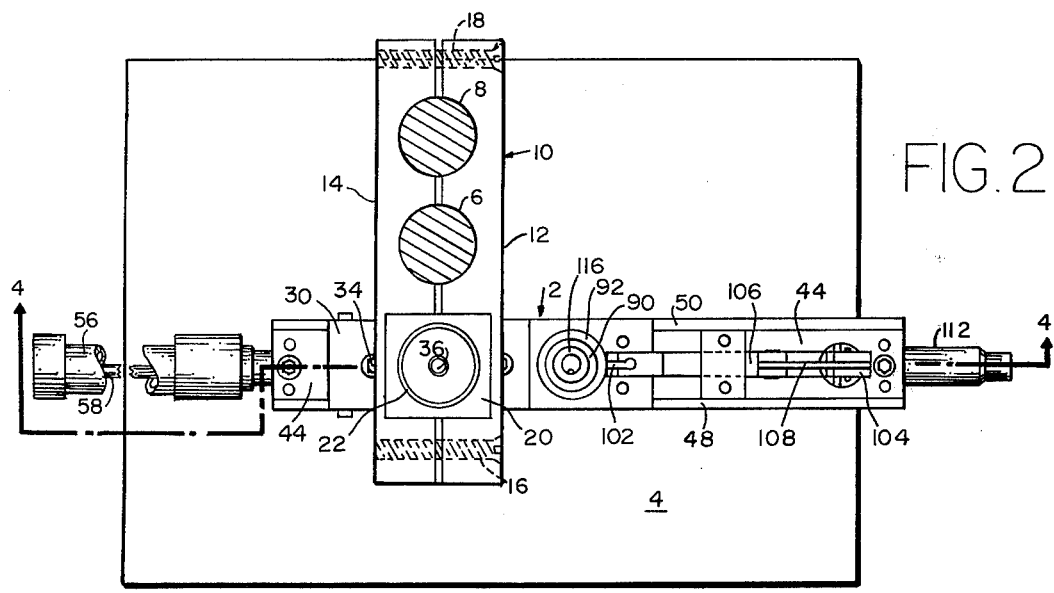

MACHINE FOR DRIVING SPRING PINS

BACKGROUND OF THE INVENTION

The use of spring pins is extensive. A spring pin is a small cylinder (usually of metal) of selected length and diameter, slit longitudinally so that it can be circumferentially compressed whereby it may be driven into a slightly smaller cylindrical hole.

Because spring pins are usually small and difficult to manipulate by hand, it has been found expedient to drive the pins into the holes through the use of a specially designed hand tool or semi-automatic machine. One such tool is shown in the patent to Fox U.S. Pat. No. 3,788,537 for Hand-Loaded Pin Chuck.

SUMMARY OF THE INVENTION

The machine of the present invention is designed to drive one at a time a succession of spring pins all of the same selected length and diameter into appropriately sized holes in a work piece. After each pin is driven into the work piece, the work piece will be moved to bring the next hole into alignment with the pin driving means. The pins are delivered through a supply line to the machine in aligned order. When the machine is actuated, a shuttle located under the holding station of the supply line and carrying one pin in a vertical cylindrical passage moves laterally to locate the passage and pin beneath a punch of suitable length and diameter and directly above the hole in the work piece.

The punch is then actuated automatically to drive the pin into the work piece to the required depth. The punch is withdrawn to a position above the shuttle and the shuttle returns laterally to its initial position below the pin holding station. The next pin now released falls into the vertical pin receiving passage in the shuttle while restraining means is actuated to hold back the next following pin in the supply line. This completes the cycle.

The cycle is repeated by first relocating the work piece, then again actuating the machine to shift the shuttle from the supply position to the punch position, drive the pin therein into the work piece, withdraw the punch and return the shuttle to the supply position at which the next pin is released to fall into the shuttle to complete the cycle.

BRIEF DESCRIPTION OF THE DRAWINGS

FIG. 1 is a side elevation.
FIG. 2 is a plan view.
FIG. 3 is an end elevation.

DESCRIPTION OF A PREFERRED EMBODIMENT

Figure 4:
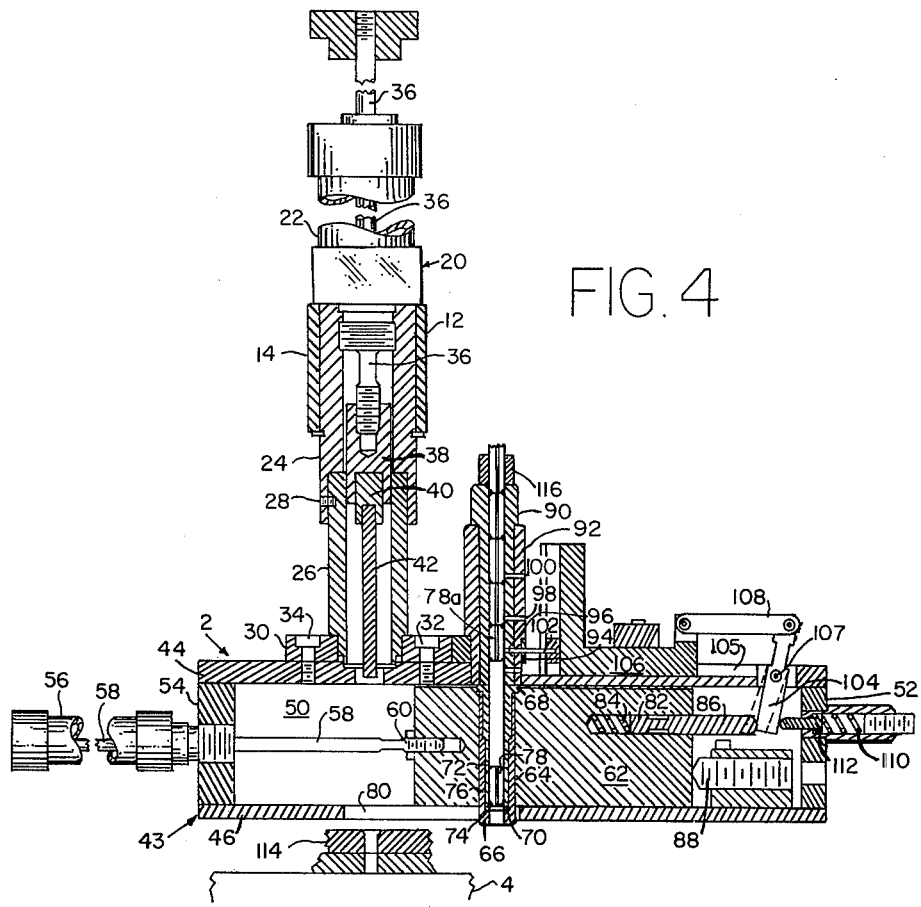
FIG. 4 is a vertical section taken on the line 4—4 of FIG. 2 showing the location of the parts prior to the start of a cycle. The shuttle is loaded.

The machine, generally referred to at 2, is mounted on a base plate 4. Two vertical supporting posts 6 and 8 are firmly secured to plate 4.

A clamp 10 comprised of sturdy plates 12 and 14 with screws 16 and 18 for drawing the plates together in secured position on posts 6 and 8 carries the machine 2 and also a pin feeder (not shown).

The plates 12 and 14 at their ends (see FIG. 2) are also clamped on the lower portion of a hydraulic cylinder and piston unit 20 from which the machine 2 is suspended at a suitable distance above base plate 4.

The unit 20 (see FIGS. 4 and 5) comprises a cylinder 22 to the lower end of which is affixed a cylindrical extension 24 gripped by the plates 12 and 14. A smaller cylindrical extension 26 secured to extension 24 by set screw 28 is fastened to a rectangular plate 30 from which the lower part of machine 2 is carried by cap screws 32 and 34.

Cylinder 22 has a vertically movable piston 36 therein. A connector 38 at one end is screw threaded to the end of piston 36 and at the other end is screw threaded to a punch holder 40. A punch 42 is in pressed fit engagement with holder 40.

The body of machine 2 is generally in the form of a long narrow box 43 having sides and ends formed by an upper plate 44, a lower plate 46, a front plate 48, a rear plate 50 and end plates 52 and 54. A cylinder and piston unit 56 is mounted horizontally on end plate 54 so that piston 58 extends into box 43 where its end 60 is adjustably screw threaded into a shuttle 62, which fits closely but slideably within the confines of box 43. The arrangement is such that movement of piston 58 can move shuttle 62 back and forth from the position shown in FIG. 4 to that shown in FIG. 5.

The shuttle 62 includes auxiliary devices which will now be described. There is a vertical cylindrical hole 64 in which is a removeable punch pilot tube 66. This tube is flanged at its upper end at 68 to rest on the upper surface of shuttle 62 so that it will be accurately located vertically in hole 64. Tube 66 is made in two parts which are securely telescoped together with an O-ring 70 or other collet-like device maintained in position between the end of inner part 72 and an adjacent shoulder 74 on the outer part 76. The interior diameter of pilot tube 66 is slightly greater than the diameter of spring pin 78 shown therein in FIG. 4. The interior diameter of O-ring 70 is slightly less than the diameter of spring pin 78 so that the pin cannot fall completely through 66. The lower end of tube 66 extends into a longitudinal slot 80 in bottom plate 46 so that movement of shuttle 62 will be unimpeded.

Figure 5:
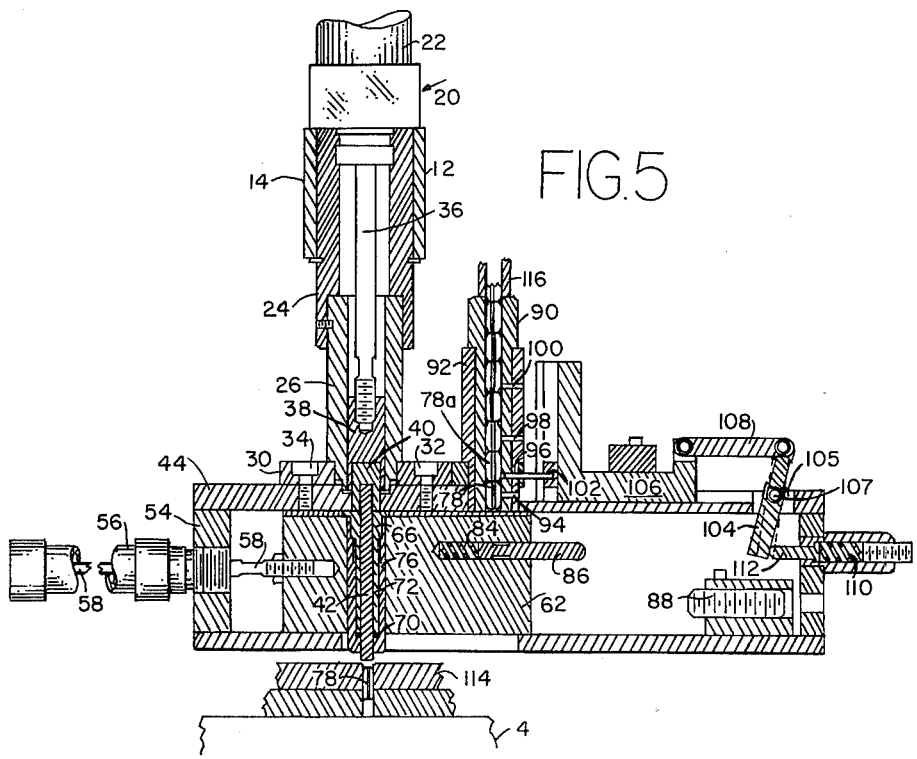
FIG. 5 is a vertical section similar to FIG. 4 with the shuttle in punch receiving position. The pin has been driven into the work piece by downward movement of the punch.

On the right hand end of shuttle 62 as viewed in FIGS. 4 and 5 is a hole 82 containing a compression spring 84 and a movable related plunger 86. An adjustable stop 88 is mounted on bottom plate 46 to limit movement of shuttle 62 to the right. Stop 88 is adjusted so that when shuttle 62 is in engagement therewith, the punch pilot tube 66 is directly beneath a spring pin feed tube 90.

Feed tube 90 is a tubular element which is removeably placed in vertical positioning tube 92 which is fixed to top plate 44. The lower end of feed tube 90 is flush with the lower surface of top plate 44 so it will not interfere with movement of shuttle 62. Feed tube 90 and positioning tube 92 have a plurality of holes 94, 96 and 98 and 100 which are in horizontal alignment when the feed tube 90 is properly positioned in tube 92. An escapement pin 102 is selectively positioned in one set of aligned holes at a level which will enable it to engage the next spring pin before the lower end of the latter had descended to the level of the top of shuttle 62. The purpose of this arrangement is to insure that only one spring pin 78 falls from the feed tube 90 into the punch pilot tube 66 when the shuttle is in the position shown in FIG. 4.

Escapement pin 102 is actuated in the following manner. As the shuttle is moving to the right toward stop 88, the punch pilot tube 66, is empty, the escapement pin is withdrawn (see FIG. 5) and the next pin 78 is riding on the upper moving surface of the shuttle (see FIG. 5). Shortly before shuttle 62 engages stop 88 and before pilot tube 66 comes into alignment with feed tube 90, plunger 86 will engage lever 104 pivoted at 107 in an opening 105 in top plate 44. This causes lever 104 to be moved counterclockwise. A slide 106 connected to the upper end of lever 104 by a link 108 is moved to the left to move escapement pin 102 into tight engagement with pin 78a. Immediately after pin 78a has been secured against downward movement in feed tube 90, the shuttle 62 engages stop 88 at which point the punch pilot tube 66 has come into alignment with feed tube 90 and the unrestrained pin 78 falls down into pilot tube 66 to be stopped by O-ring 70. The situation then is as shown in FIG. 4.

In order to insure early and firm engagement of escapement pin 102 with the spring pin 78a, plunger 86 encounters lever 104 well before shuttle 62 engages stop 88. When movement of slide 106 is stopped by engagement of escapement pin 102 with spring pin 78a, rotation of lever 104 must also stop and the spring 84 behind plunger 86 is then compressed until the shuttle engages the stop. Thus, during the dwell period of the shuttle 62 while in the position shown in FIG. 4, the spring 84 provides a constant force to hold the escapement pin against the spring pin. This force continues in effect until the shuttle 62 has moved to the left at the start of the next cycle far enough to place the pilot tube 66 completely out of alignment with feed tube 90. It is only then that the escapement pin releases 102 spring pin 78a permitting it to drop to rest on the top of shuttle 62 as shown in FIG. 5.

In order to insure release of escapement pin 102 when shuttle 62 moves to the left, a compression spring 110 and related plunger 112 act on lever 104 to cause clockwise rotation after plunger 86 has moved away to the left. This moves slide 106 to the right pulling the escapement pin with it to free the spring pin. Spring 110 is of course weaker than spring 84 so that the movements of lever 104 occurs in the proper sequence.

PIN INSERTION PROCEDURE

With the parts of the machine in the position shown in FIG. 4, and with the hole in the work piece 114 into which the spring pin is to be driven located directly below punch 42, the operator place the machine in operation. The air cylinder 56 moves piston 58 to the left shifting shuttle 62 from the position in FIG. 4, to that in FIG. 5. Piston 58 is then at the end of its stroke and holds shuttle 62 in a position in which pilot tube 66 is aligned with punch 42.

Piston 36 is then actuated to move punch 42 downward into pilot tube 66 to engage spring pin 78 and to force the pin past O-ring 70 into the hole in the work piece 114. The extent of the entry of the spring pin into the work piece is controlled by the vertical location of the work piece with respect to the punch whose length and downward stroke are constant. Downward movement of the punch is preferably limited by the stroke of the piston 36 in cylinder 22.

Punch 42 is then withdrawn, cylinder 56 is actuated to move shuttle 62 to the right from the position of FIG. 5 to that of FIG. 4. The next pin in feed tube 90, unrestrained and riding on the upper surface of the shuttle falls into pilot tube 66. The next following pin is held against descent by escapement pin 102. This concludes the cycle.

Before the next cycle is initiated the work piece is shifted to place the next hole in the work piece below punch 42. The means for causing automatic sequential operation of the cylinders 56 and 22 is well understood in the art and hence the details of this structure need not be disclosed. Alternatively, movement of shuttle 62 and punch 42 could be manually induced.

VARYING SPRING PIN SIZES

A major advantage of the present construction is the ability of the machine to accommodate spring pins of different sizes covering a wide range limited only by design considerations. For example, in one model, pins ranging from 1/16 inch diameter by 3/16 inch length to pins ¼ inch diameter by 1¼ inches length can be handled. This flexibility is achieved by having just three interchangeable parts, the punch 42, the pilot tube 66 and the feed tube 90.

To effect the changes of these parts the machine is first released from the clamping plates 12 and 14. Extensions 24 and 26 are disconnected to provide access to punch 42. Connector 38 is then unscrewed from the end piston 36 so that punch 42 can be removed to be replaced by a different punch of proper length and diameter to cooperate with the new size of spring pins.

To substitute for feed tube 90 and pilot tube 66 other tubes with proper sized passages to accommodate the new size of pins, the pin feed pipe 116 is disconnected from the upper end of feed tube 90. Link 108 is disconnected from slide 106 so that the slide can be moved to the right far enough to permit removal of escapement pin 102 from whatever set of aligned holes 94, 96, 98 or 100 it may then be in. As soon as escapement pin 102 is out of the way, feed tube 90 can be withdrawn from positioning tube 92 to be followed by upward removal of pilot tube 66 which also passes through tube 92.

New pilot and feed tubes sized to accommodate the new spring pins are then inserted in the shuttle 62 and positioning tube 92 respectively. Escapement pin 102 is replaced in the correct holes 94, 96, 98 or 100 according to the length of the new pins and slide 106 is moved to the left and reconnected to link 108. Feed pipe 116 is reconnected to feed tube 90 and extension 26 reconnected to extension 24.

The entire machine 2 is finally reattached to clamp plates 12 and 14 at a correct level above the table 4 to meet the requirements of the vertical dimensions of the next work pieces into which the new pins are to be inserted. The machine is then ready to resume operation.

While the cylinders 22 and 56 are preferably arranged to function automatically in proper sequence, the valving on the fluid lines to these cylinders could be under manual control if desired. In fact the shuttle 62 and the punch 42 could be manually actuated without departing from the principle of the invention.

Preferably, the piston in cylinder 22 on its downward stroke is hydraulically operated to produce the proper speed and force. The upward stroke is air actuated. The piston in cylinder 56 is preferably air actuated in both directions.

While the foregoing description has related to the insertion particularly of spring pins by the machine, it is to be understood that this machine may be used to insert any type of pin, solid or grooved, capable of entering a work piece, whether the work piece has a hole to receive the pin or the work piece is of such material that the pin can be driven therein without the need for a prepared hole.

The use of the term spring pin in the claims is illustrative only and is not to be construed as limiting the use of the machine to spring pins per se.

It is intended to cover all changes and modifications of the example of the invention herein chosen for purposes of disclosure which do not constitute departures from the spirit and scope of the invention.

I claim:

1. A machine for inserting a spring pin in a work piece comprising a supporting structure having at least upper and end members in the form of rigid plates,
    a punch mounted vertically on said upper plate,
    a shuttle carried by said plates and moveable horizontally,
    a spring pin feed tube mounted on said upper plate,
    means for supplying independent gravity moved spring pins in sequence to said feed tube,
    a punch pilot tube extending vertically through said shuttle,
    the length of said pilot tube being greater than the length of said spring pins,
    means for moving said shuttle in one direction to place said pilot tube in loading position in alignment with said feed tube,
    means permitting one spring pin to fall from said feed tube into said pilot tube when said tubes are aligned while restraining the descent of all spring pins in said feed tube thereabove,
    means in said pilot tube for releaseably holding said one spring pin from falling therethrough,
    means for moving said shuttle in the opposite direction to a position in which said pilot tube is aligned with said punch,
    means operable while said shuttle is moving toward said punch for removing the restraining means on the spring pins in said feed tube so that spring pins in said feed tube will fall a distance of one pin and the leading pin in said feed tube will engage and be stopped by said shuttle,
    means for actuating said punch when said punch and pilot tube are aligned to drive said spring pin then in said pilot tube downward into a work piece located therebelow,
    means for withdrawing said punch from said pilot tube,
    means for again moving said shuttle to the original loading position in which said pilot tube is again in alignment with said feed tube,
    and means actuated by and during movement of said shuttle from punch position to loading position for applying said restraining means to the spring pin next above the spring pin then resting on said shuttle prior to said pilot tube and feed tube coming into alignment, whereby when said pilot and feed tubes come into alignment, only a single spring pin will fall into said pilot tube.

2. The construction set forth in claim 1, the means for restraining descent of the spring pins in said feed tube comprising an escapement pin extending through the wall of said feed tube, a slide to which said escapement pin in connected, said slide movable toward and away from said feed tube, and a lever connected to said slide movable by said shuttle as the latter approaches loading position to move said slide toward said feed tube to press said escapement pin against a spring pin in said feed tube.

3. The construction set forth in claim 1, the means in said pilot tube for releaseably holding a spring pin therein comprising an O-ring.

4. The construction set forth in claim 1, said punch, feed tube and punch pilot tube all being removable whereby they may be replaced by another set of punch, feed tube and punch pilot tube sized to accommodate spring pins of different diameters from those previously being inserted in a work piece.

5. The construction set forth in claim 1, said feed tube being removably supported by a positioning tube mounted on said structure, said restraining means comprising an escapement pin located in aligned holes in said feed tube and positioning tube.

6. A machine for inserting spring pins in a work piece, said machine comprising,
    a shuttle having a vertical passage therethrough adapted to receive and hold therein a spring pin,
    a supporting structure for said shuttle whereby said shuttle can be moved back and forth between a loading position and an inserting position,
    spring pin feeding means mounted on said structure, said spring pin feeding means comprising a feed tube with spring pins in sequence positioned therein, means for restraining downward movement of all said spring pins except the lowermost of said pins when the passage in said shuttle comes into aligned loading position below said feed tube whereby a single spring pin will fall into said passage at said loading position,
    and other means including a punch on said structure for forcing said single spring pin into a work piece positioned below said shuttle when said shuttle is at said inserting position.

7. The construction set forth in claim 6, and means for releasing said restraining means after said passage in said shuttle has moved away from said loading position below said feed tube.

8. The construction set forth in claim 7, and a fluid actuated cylinder and piston for moving said shuttle from loading to inserting position and back to loading position, and a fluid actuated cylinder and piston for moving said punch downward into said passage when said punch and passage are aligned to drive said single spring pin into said work piece and then retracting said punch.

9. The construction set forth in claim 8, and automatically controlled means for causing said two cylinders and related pistons to operate in correct sequence to effect loading of said shuttle passage with a single spring pin followed by insertion of said single spring pin into a work piece.

* * * * *